Oct. 28, 1947.  D. B. VANDEWATER  2,429,704
ELECTRICALLY HEATED ROTATABLE CYLINDER DRAIN MEANS
Filed June 7, 1945  2 Sheets-Sheet 2

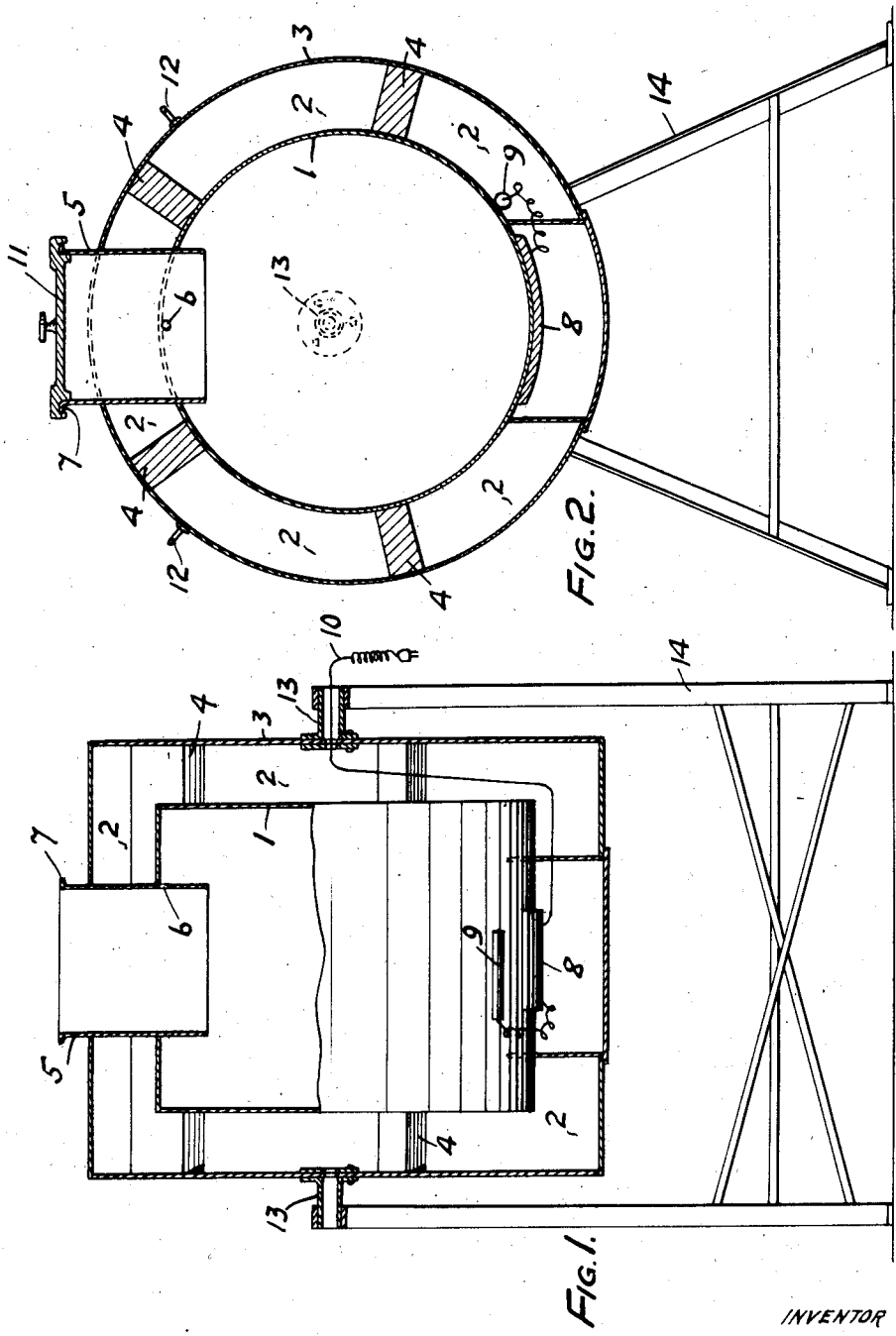

INVENTOR
Donald B. Vandewater
BY
ATTORNEYS.

WITNESS:

Patented Oct. 28, 1947

2,429,704

UNITED STATES PATENT OFFICE 2,429,704

ELECTRICALLY HEATED ROTATABLE CYLINDER DRAIN MEANS

Donald B. Vandewater, Poughkeepsie, N. Y., assignor to The De Laval Separator Company, New York, N. Y., a corporation of New Jersey Application June 7, 1945, Serial No. 597,980

3 Claims. (Cl. 219—38)

My invention relates to heaters for heating water or other liquids by electrical energy.

The object of my invention is to provide an electrically heated liquid container which, while being easy to fill and pour from and economical of power, will normally have enough residual liquid adjacent the heating element to insure that the container will not be damaged by overheating but which may be completely drained when necessary.

My improved heater, in its preferred embodiment, includes certain features which are not my invention but with which I have combined features designed by me in order that the objects of my invention may be effected, or effected with maximum efficiency. Thus, my invention embodies a cylindrical metal container having an opening, functioning both as inlet and outlet, through the cylindrical wall at one side and at the other side an electric heating element (which may be inside or outside the container); the container being so supported that it may be easily turned around the contents with little or no change of liquid level; the container, by reason of the location of the heating element opposite the inlet-outlet (supplemented, if desired, by supporting the container off center) tending to automatically return to its normal position. These features form the subject matter of an application filed of even date herewith by Donald F. Ayres, Serial No. 597,979.

In my improvement, the outlet (which, as above stated, is also the inlet and which should be large enough to provide for quick and easy filling and emptying of the container) is surrounded by a tube that extends a substantial distance outside the cylindrical wall and by providing it with a slight flare I eliminate dripping and running of liquid down the outside. By extending the tube a substantial distance inside the container I prevent quick complete emptying, even if turned with the outlet at the extreme bottom. However, by putting a small hole through the tube, tangent with the inside of the container, I provide for complete, though slow, draining of all liquid when that is desired.

In the accompanying drawings, which illustrate embodiments of my invention—

Fig. 1 is a partial longitudinal section of a heater mounted on trunnions and the supports therefor.

Fig. 2 is a section at right angles to that shown in Fig. 1.

Figure 3:
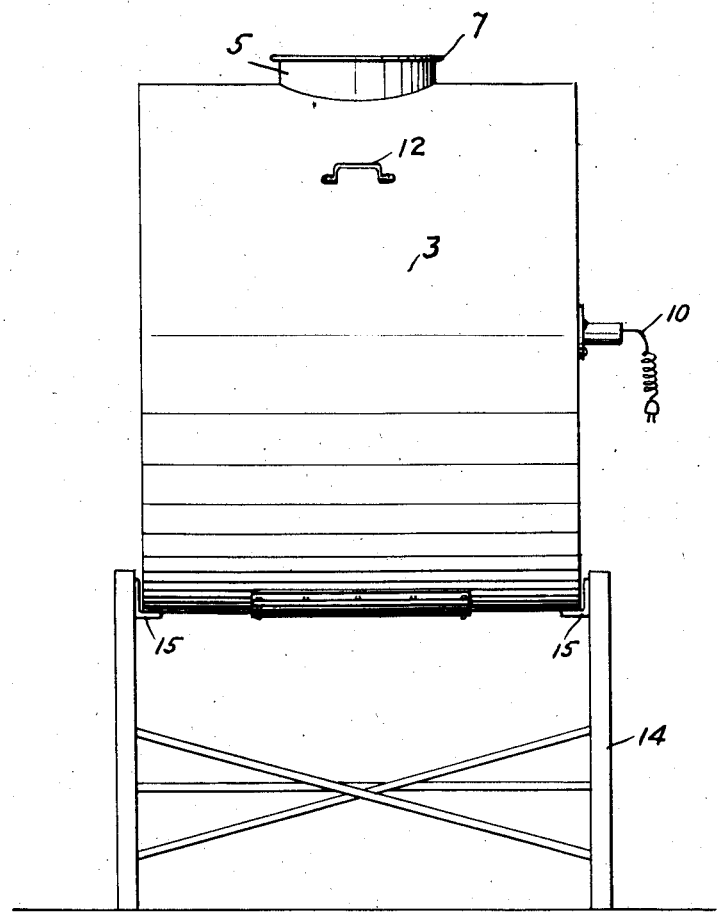
Fig. 3 is a side view of a heater arranged to roll on horizontal ways.

1 is a cylindrical container for liquid to be heated, surrounded by heat insulation in the spaces 2 enclosed by an outer casing 3. The container is held in the center of the casing by spacers 4—4.

An inlet and outlet tube 5 extends through the insulation-containing space 2 and to a substantial distance inside the container 1 and has a small hole 6 through it tangent with the inside of container 1. The outer end of the tube is surrounded by a flange or bead 7.

An electric heater 8 and a thermostatic switch 9 are secured in heat transfer relation with the container 1 and a cord 10 is provided for connection to a source of electric energy.

An easily removable cover 11 on the outer end of the tube 5 prevents escape of vapors from the heater. Handles 12 provide means for tipping the heater into position to pour out liquid.

As shown in Figs. 1 and 2, the heater is supported by trunnions 13—13 carried by a frame 14. As shown in Fig. 3, the heater is supported, on a similar frame 14, by ways 15 on which it may be rolled.

In operation the desired quantity of liquid is poured into the heater, the cover 11 applied and the current turned on. When the liquid is heated to the temperature for which the thermostat 9 is set the current is turned off.

When hot liquid is wanted, the operator places a receptacle at one side of the heater, removes the cover 11 and by means of one of the handles 12 turns the heater till the desired quantity flows out. When he releases the handle the heater will return to its normal position with the outlet at the top. Even if the heater is turned with the outlet at the exreme bottom for a short time a quantity of liquid equal to a segment of a cylinder with its inner surface at the inner end of the tube 5 will be retained. If it is desired to completely empty the container, it is held with the outlet at the bottom long enough to permit all of the liquid to flow out through the small hole 6.

What I claim and desire to protect by Letters Patent is:

1. In a heater for liquids, the combination with a heat-insulated cylindrical container, an electric heating element in heat-transfer relation at the cylindrical surface of the cylinder, and a combined liquid inlet and outlet in said cylindrical surface and opposite the heating element, of a tube surrounding the inlet-outlet and extending substantially perpendicular to the cylinder axis for a substantial distance inside the cylinder to thereby, in the emptying operation, retain enough residual liquid adjacent the heating element to insure against damage of the container by overheating.

2. A heater as defined in claim 1 in which the tube is provided inside the cylinder with a hole of relatively small diameter that is tangent with the inside wall of the container to thereby permit slow drainage of residual liquid when complete emptying is desired.

3. A heater as defined in claim 1, in which the tube is provided inside the cylinder with a hole adjacent the cylindrical surface of the cylinder and in a side of the tube facing one end of the cylinder, the hole being tangent with the inside wall of the container to thereby permit slow drainage of residual liquid when complete emptying is desired.

DONALD B. VANDEWATER.

REFERENCES CITED

The following references are of record in the file of this patent:

UNITED STATES PATENTS

| Number | Name | Date |
|---|---|---|
| 2,227,662 | McHarg | Jan. 7, 1941 |
| 2,172,917 | Voigt | Sept. 12, 1939 |
| 2,057,353 | Whittemore, Jr. | Oct. 13, 1936 |